United States Patent
Termorshuizen

(10) Patent No.: US 6,762,279 B2
(45) Date of Patent: Jul. 13, 2004

(54) POLYOL PROCESSING

(75) Inventor: Paul A. Termorshuizen, Rozenburg (NL)

(73) Assignee: Huntsman International LLC, Salt Lake City, UT (US)

(*) Notice: Subject to any disclaimer, the term of this patent is extended or adjusted under 35 U.S.C. 154(b) by 0 days.

(21) Appl. No.: 10/336,518

(22) Filed: Jan. 3, 2003

(65) Prior Publication Data
US 2003/0098278 A1 May 29, 2003

Related U.S. Application Data

(63) Continuation of application No. PCT/EP01/07363, filed on Jun. 28, 2001.

(51) Int. Cl.$^7$ ................................................ C08G 65/34
(52) U.S. Cl. ...................... 528/425; 528/486; 528/421; 210/634; 210/639
(58) Field of Search ................. 528/425, 421, 528/486; 210/634, 639

(56) References Cited

U.S. PATENT DOCUMENTS

| | | |
|---|---|---|
| 3,829,507 A | 8/1974 | Zey |
| 3,865,806 A | 2/1975 | Knodel |
| 4,125,505 A | 11/1978 | Critchfield et al. |
| 4,209,609 A | 6/1980 | Haas |
| 5,925,687 A | 7/1999 | Guettes et al. |

FOREIGN PATENT DOCUMENTS

| | | |
|---|---|---|
| GB | 916552 | 1/1963 |
| JP | 56 010527 | 2/1981 |
| WO | WO 96/20972 | 7/1996 |
| WO | WO 98/17708 | 4/1998 |

OTHER PUBLICATIONS

Yen, D.R. et al.: "Fractional Precipitation of Star Poly(ethylene Oxide)", Macromolecules, US, American Chemical Society, Easton, vol. 29, No. 27, Dec. 30, 1996, pp. 8977–8978.

Primary Examiner—Duc Truong
(74) Attorney, Agent, or Firm—Nicole Graham

(57) ABSTRACT

Process for purification of a polyol comprising the step of bringing the polyol, neutralized or un-neutralized, into contact with an organic salt aqueous solution, mixing the organic salt aqueous solution and the polyol, allowing the mixture to separate into a polyol phase and a salt water phase and removing the salt water phase.

20 Claims, No Drawings

POLYOL PROCESSING

CROSS REFERENCE TO RELATED APPLIACTIONS

This application is a continuation of international application PCT EP01/07363, filed Jun. 28, 2001.

FIELD OF THE INVENTION

This invention relates to a process for producing polyols. More specifically, it pertains to an improved process for removing impurities from the polyols, removing alkaline catalysts from the polyols used in the production of polyether polyols, and to polyether polyols produced by said process.

BACKGROUND OF THE INVENTION

Process as for purifying polyether polyols involve either:

1) Neutralisation with an acid followed by dehydration and filtration of the resulting salt crystals.
2) Solvent extraction. Such processes require the use of organic solvents to dissolve the polyol and water to hydrolyse the alcoholate and extract the potassium hydroxide. After separation of the organic and aqueous layers, the organic solvent needs to be removed from the final polyol. This requires time and energy, and therefore is costly. Solvent traces may remain in the final polyol.
3) Ion exchange. Such processes require the use of ion exchange beds or magnesium silicates followed by filtration and also the use of solvent for efficient operation. The resin beds need to be regenerated or disposed of, while the solvent used needs to be thoroughly removed for the same reason as above.

It is generally known that polyether polyols with reduced levels of impurities can, when reacted with a polyisocyanate, produce improved quality flexible polyurethane foams. Therefore, there is a need for a process that reduces the level of impurities in polyether polyols.

The production of a polyether polyol from alkylene oxides is ordinarily carried out by the addition of the alkylene oxides to an initiator compound having active hydrogen atoms in the presence of an alkaline catalyst at temperatures of from about 70° C. to about 160° C. The alkaline catalyst is usually present in quantities of about 0.05 to 2 percent by weight of the reactants. A typical production method for a flexible polyether polyol involves the reaction of propylene oxide with glycerol in the presence of potassium hydroxide. The resulting un-neutralised polyol contains potassium alcoholate. The potassium alcoholate must be neutralised and the potassium salt must be removed so that the polyol will not react adversely with isocyanate in polyurethane production. Therefore, there is also a need for a process that is effective in neutralising the residual alkaline species used in the production of polyether polyols and allows reduction of alkaline catalyst residues after the preparation of these polyether polyols.

It is known that in some cases flexible polyurethane foam odour may create a problem. The causes of odour problems originate from side reactions during polyol manufacture and processing into a polyurethane polymer, as described in e.g. U.S. Pat. No. 5,925,687. Therefore, there is also a need for a means to reduce the odour of the polyurethane foam produced from polyether polyols.

SUMMARY OF THE INVENTION

Surprisingly it has now been found that by using an aqueous organic salt solution or acidic aqueous organic salt solution, improved quality of polyols, especially polyether polyols are obtained. More specifically, impurities and catalyst are reduced from the polyol through the separation of the polyol and salt phase. Furthermore, the purified polyol provides foam with improved stability, which in turn exhibits an improved odor profile.

Therefore, the invention relates to a process for producing polyols. More specifically, it pertains to an improved process of purifying from the polyols, removing alkaline catalysts used in the production of polyether polyols, and to polyether polyols produced by said process.

According to one embodiment, the present invention is directed to producing improved quality of especially polyether polyols which, in turn, are used for the production of improved flexible polyurethane foams. It is generally known that polyether polyols, while still meeting acceptable commercial specifications, can produce improved quality flexible polyurethane foams by reducing the level of impurities. The process of the present invention reduces the levels of these impurities thereby providing polyether polyols which, upon reaction with polyisocyanate, yield a higher quality flexible foam.

According to another embodiment of the present invention, the process of the present invention is effective in neutralising the residual alkaline species used in the production of polyether polyols. The production of a polyether polyol from alkylene oxides is ordinarily carried out by the addition of the alkylene oxides to an initiator compound having active hydrogen atoms in the presence of an alkaline catalyst at temperatures of from about 70° C. to about 160° C. The alkaline catalyst is usually present in quantities of about 0.05 to 2 percent by weight of the reactants. A typical production method for a flexible polyether polyol involves the reaction of propylene oxide with glycerol in the presence of potassium hydroxide. The resulting un-neutralised polyol contains potassium alcoholate. The potassium alcoholate must be neutralised and the potassium salt must be removed so that the polyol will not react adversely with isocyanate in polyurethane production.

The process according to the present invention allows reduction of alkaline catalyst residues after the preparation of these polyether polyols.

According to a further embodiment of the present invention, it has been found that the odour of the polyurethane foam produced from the polyether polyols of the process of the present invention is reduced. It is known that in some cases flexible polyurethane foam odour may create a problem. The causes of odour problems originate from side reactions during polyol manufacture and processing into a polyurethane polymer, as described in e.g. U.S. Pat. No. 5,925,687. The present process reduces the substances from the polyether polyols causing the odour.

DETAILED DESCRIPTION OF THE INVENTION

The present invention is directed to a process for purification of a polyol, neutralised or un-neutralised, comprising the step of bringing the polyol into contact with an aqueous organic salt solution, mixing the aqueous organic salt solution and the polyether polyol, allowing the mixture to separate into a polyol phase and a salt water phase, and removing the salt water phase.

According to another embodiment of the present invention, the present invention is directed to a process for purification and neutralisation of a polyether polyol by bringing the un-neutralised polyol into contact with an aqueous organic salt solution and an organic acid, mixing the aqueous organic salt solution, the organic acid and the polyether polyol, allowing the mixture to separate into a polyol phase and a salt water phase, and removing the salt water phase.

The process of the present invention requires an aqueous organic salt solution and a polyether polyol, which may or may not contain an alkaline catalyst.

The process of the present invention is especially useful to polyether polyols, which are prepared using an alkaline catalyst. Methods for the preparation of the polyols are well known and generally involve the reaction of at least one alkylene oxide with an active-hydrogen-containing initiator compound in the presence of an alkaline catalyst. Polyols suitable for use in the present invention include, for example, linear and branched chain polyether polyols having aliphatic or aromatic-aliphatic character. The polyols may be prepared from known active-hydrogen-containing initiators used in the preparation of polyols such as amines and polyhydroxy compounds. The alkylene oxide is typically an alkylene oxide such as ethylene oxide, propylene oxide or butylene oxide. Alkylene oxides may be employed as mixtures.

Polyether polyols and methods for their preparation are, as previously stated, well-known, and illustrative references to said polyols and methods include U.S. Pat. No. 3,865,806, U.S. Pat. No. 4,125,505, U.S. Pat. No. 4,209,609, and the references cited therein. The teachings of these patents and references are incorporated herein by reference.

An essential component of the process according to the present invention is an aqueous organic salt solution. The aqueous organic salt solution may be selected out of the following, including any combination thereof: alkali metal carboxylates such as formate, acetate, propionate, isobutyrate, pivalate, oxalate, maleate, succinate, lactate, adipate, glycolate, benzoate, phthalate, tartrate and carbonates.

The organic salt may be added prior to, simultaneously with, or subsequent to the addition of neutralizing acid used for the neutralisation of un-neutralised polyether-polyols. The strength of the aqueous organic salt solution preferably varies between 10 to 70% w/w, preferably 15–45% w/w. The neutralising acid is preferably present at a level of 0.5–5% by weight of the aqueous organic salt solution. The acid moiety forming the salt may not necessarily be identical with the acid used for the neutralisation. Preferred acids to be used are organic acids including the acids forming the above mentioned salts.

The process of the present invention may be accomplished by adding the aqueous organic salt solution and the acid, if required, to the polyol neutralised or un-neutralised at the end of the alkoxylation step in a manner such that the organic salt is distributed evenly throughout the polyol. Typically, even distribution of the salt and the acid, if required, is accomplished by methods such as, for example, stirring or inert gas bubbling. The time required to complete the process is a function of the mass of the polyol to be purified, the rate of addition of organic salt, the rate and type of mixing, the temperature, and the like.

The process for preparing pure polyols, again according to the instant invention, includes (a) for batch wise operation, providing a reactor to which polyether polyols containing alkaline catalyst and an aqueous organic salt solution are added and mixed; and (b) for continuous mode operation, providing a mixer into which monitored polyether polyols containing alkaline catalyst and an aqueous organic salt solution are fed concurrently and essentially continuously. Further, in both the batch wise and continuous operation provisions for at least stabilizing the mixture to completely insolubilize all salt solution present and provision for removing the salt phase and recovering high purity polyether polyols must be present. Typically, this will require suitable physical separation equipment.

The process is carried out as a conventional extraction process. It may be carried out batch wise or continuously. If the process is carried out batch wise this may be done once or more, preferably 1–5 times, most preferably 1 or 2 times.

The process may be conducted at room temperature or at elevated temperature. Preferably, the temperature will range from 25 to 200° C., more preferably between 75 to 150° C. Once the polyol and the aqueous organic salt solution have been combined they are mixed. The amount of aqueous organic salt solution used may vary over a wide range. Preferably, the weight ratio of the aqueous organic salt solution to the polyol is between 1:50 and 1:2, preferably between 1:10 and 1:2. The mixing period depends to a certain extent of the technique used and of the amount of polyol being used.

Upon allowing the reaction mixture to stand after mixing with the aqueous organic salt solution, the mixture then separates into an upper layer containing the purified polyol and a lower layer containing the salt water. Addition of water immiscible organic solvent may be added to further improve the separation of the polyol and salt water phase. In which case, the water immiscible solvent needs to be removed in an additional processing step.

The purified polyol can then be further treated to yield the final polyol by processes known in the art. These include the removal of water by stripping at reduced pressure to induce crystallization of the salt, which can then be removed by filtration.

The process according to the present invention is illustrated by the examples and should not be construed as limiting the scope of the present invention. Unless otherwise indicated, quantities are expressed in parts by weight and percent by weight.

EXAMPLES

Example 1

A polyether polyol (un-neutralised DALTOCEL® F428 polyol) is heated in a vessel to 90° C. The aqueous potassium adipate solution (30% concentration) is added to the vessel so that the ratio of polyol to salt solution is in the order of 7 parts (by wt) polyol to 1 part (by wt) salt solution. The salt solution is first acidified by adding 1.6% w/w of adipic acid. The pressure of the vessel is increased to 2.5 bar a before agitating the contents for 1 hour whilst heating to 130° C. The agitator is stopped and the contents of the vessel allowed to separate for 1 hour. The bottom water/salt phase is drained off. The remaining polyol is then further treated to yield the final polyol by the removal of water by stripping at reduced pressure to induce crystallization of the remaining salt, which is then removed by filtration.

Example 2

A polyether polyol (un-neutralised DALTOCEL® F428 polyol) is heated in a vessel to 90° C. The aqueous potassium adipate solution (30% concentration) is added to the vessel so that the ratio of polyol to salt solution is in the order of 7 parts (by wt) polyol to 1 part (by wt) salt solution. The salt solution is first acidified by adding 1.6% w/w of adipic acid.

The pressure of the vessel is increased to 2.5 bar a before agitating the contents for 1 hour whilst heating to 115° C. The agitator is stopped and the contents of the vessel allowed to separate for 1 hour. The bottom water/salt phase is drained off. The remaining polyol is then further treated to yield the final polyol by the removal of water by stripping at reduced pressure to induce crystallization of the remaining salt, which is then removed by filtration Example 3

A polyether polyol (un-neutralised DALTOCEL® F428 polyol) is heated in a vessel to 115° C. The aqueous potassium adipate solution (30% concentration) is added to the vessel so that the ratio of polyol to salt solution is in the order of 35 parts (by wt) polyol to 7.4 parts (by wt) salt solution. The salt solution is first acidified by adding 1.6% w/w of adipic acid. The pressure of the vessel is increased to 2.5 bar a before agitating the contents for 1 hour whilst heating to 115° C. The agitator is stopped and the contents of the vessel allowed to separate for 1 hour. The bottom water/salt phase is drained off. The remaining polyol is then further treated to yield the final polyol by the removal of water by stripping at reduced pressure to induce crystallization of the remaining salt, which is then removed by filtration.

Example 4

A polyether polyol (DALTOCEL® F428 polyol) is heated in a vessel to 80° C. The aqueous potassium adipate solution (20% concentration) is added to the vessel so that the ratio of polyol to salt solution is in the order of 7 parts (by wt) polyol to 3 parts (by wt) salt solution. The salt water polyol mixture is mixed for 1 hour at 80° C. The agitator is stopped and the contents of the allowed to separate. The bottom water/salt phase is drained off. The remaining polyol is then further treated to yield the final polyol by the removal of water by stripping at reduced pressure to induce crystallization of the remaining salt, which is then removed by filtration.

Example 5

A polyether polyol (DALTOCEL® F428 polyol) is heated in a vessel to 80° C. The aqueous potassium adipate solution (20% concentration) is added to the vessel so that the ratio of polyol to salt solution is in the order of 35 parts (by wt) polyol to 5 parts (by wt) salt solution. The salt water polyol mixture is mixed for 1 hour at 80° C. The agitator is stopped and the contents of the work up vessel allowed to separate. The bottom water/salt phase is drained off. The remaining polyol is then further treated to yield the final polyol by the removal of water by stripping at reduced pressure to induce crystallization of the remaining salt, which is then removed by filtration Example 6

A polyether polyol (DALTOCEL® F428 polyol) is heated in a vessel to 110° C. The aqueous potassium adipate solution (20% concentration) is added to the vessel so that the ratio of polyol to salt solution is in the order of 7 parts (by wt) polyol to 3 part (by wt) salt solution. The pressure of the vessel is increased to 2.5 bar a before agitating the contents for 1 hour whilst heating to 110° C. The agitator is stopped and the contents of the vessel allowed to separate. The bottom water/salt phase is drained off. The remaining polyol is then further treated to yield the final polyol by the removal of water by stripping at reduced pressure to induce crystallization of the remaining salt, which is then removed by filtration.

Example 7

A polyether polyol (Un-neutralised DALTOCEL® F428 polyol) is heated in a vessel to 85° C. and neutralised with adipic acid (0.23% by weight of the polyol). The aqueous potassium adipate solution (20% concentration) is added to the vessel so that the ratio of polyol to salt solution is in the order of 7 parts (by wt) polyol to 1 part (by wt) salt solution. The pressure of the vessel is increased to 2.5 bar a before agitating the contents for 1 hour whilst heating to 120° C. The agitator is stopped and the contents of the vesssel allowed to separate. The bottom water/salt phase is drained off. The remaining polyol is then further treated to yield the final polyol by the removal of water by stripping at reduced pressure to induce crystallization of the remaining salt, which is then removed by filtration.

Example 8

A polyether polyol (DALTOCEL® F428 polyol) is heated in a vessel to 110° C. The aqueous potassium adipate solution (30% concentration) is added to the vessel so that the ratio of polyol to salt solution is in the order of 7 parts (by wt) polyol to 3 parts (by wt) salt solution. The pressure of the vessel is increased to 2.5 bar a before agitating the contents for 1 hour whilst heating to 110° C. The agitator is stopped and the contents of the vessel allowed to separate. The bottom water/salt phase is drained off. The remaining polyol is then further treated to yield the final polyol by the removal of water by stripping at reduced pressure to induce crystallization of the remaining salt, which is then removed by filtration.

Example 9

A polyether polyol (un-neutralised DALTOCEL® F428 polyol) is heated in a vessel to 110° C. The fresh aqueous potassium adipate solution (30% concentration) is added to the vessel so that the ratio of polyol to salt solution is in the order of 7 parts (by wt) polyol to 3 part (by wt) salt solution. The pressure of the vessel is increased to 2.5 bar a before agitating the contents for 1 hour whilst heating to 130° C. The agitator is stopped and the contents of the work up vessel allowed to separate for 1 hour. The bottom water/salt phase is drained off. The remaining polyol is then further treated to yield the final polyol by the removal of water by stripping at reduced pressure to induce crystallization of the remaining salt, which is then removed by filtration.

In all Examples 1–9, an improvement in foam quality based on physical properties and reduction in odor precursors was observed. Similar results were obtained using different organic salts as previously described.

What is claimed:

1. A process for purification of a polyol comprising the steps of:
    (a) bringing the polyol into contact with an organic salt aqueous solution,
    (b) mixing the organic salt aqueous solution and the polyol,
    (c) allowing the mixture to separate into a polyol phase and a salt water phase, and
    (d) removing the salt water phase.

2. The process of claim 1, wherein the polyol is a neutralized or un-neutralized polyol.

3. The process of claim 1, wherein the organic salt is selected from the group consisting of alkalimetal formate, acetate, propionate, isobutyrate, pivalate, oxalate, maleate, tartrates, succinate, lactate, adipate, glycolate, benzoate, phthalates, carbonates, and mixtures thereof.

4. The process of claim 2, wherein the organic salt is selected from the group consisting of alkalimetal formate, acetate, propionate, isobutyrate, pivalate, oxalate, maleate, tartrates, succinate, lactate, adipate, glycolate, benzoate, phthalates, carbonates, and mixtures thereof.

5. The process of claim 1, wherein the weight ratio of the aqueous organic salt solution to the polyol is between 1:50 and 1:2.

6. The process of claim 3, wherein the weight ratio of the aqueous organic salt solution to the polyol is between 1:50 and 1:2.

7. The process of claim 1, wherein the weight ratio of the aqueous organic salt solution to the polyol is between 1:10 and 1:2.

8. The process of claim 1, wherein the strength of the aqueous organic salt solution is between 10 to 70% w/w by weight of the polyol.

9. The process of claim 3, wherein the strength of the aqueous organic salt solution is between 10 to 70% w/w by weight of the polyol.

10. The process of claim 1, wherein the strength of the aqueous organic salt solution is between 15 to 45% w/w by weight of the polyol.

11. A process for purification and neutralization of an un-neutralized polyol comprising the steps of:
    (a) bringing the un-neutralised polyol into contact with an organic salt aqueous solution and an organic acid,
    (b) mixing the organic salt aqueous solution, the organic acid, and the un-neutralized polyol,
    (c) allowing the mixture to separate into a polyol phase and a salt water phase, and
    (d) removing the salt water phase.

12. The process of claim 11, wherein the organic salt is selected from the group consisting of alkalimetal formate, acetate, propionate, isobutyrate, pivalate, oxalate, maleate, tartrates, succinate, lactate, adipate, glycolate, benzoate, phthalates, carbonates, and mixtures thereof.

13. The process of claim 11, wherein the organic acid is present at a level of 0.5–5% by weight of the aqueous organic salt solution.

14. The process of claim 12, wherein the organic acid is present at a level of 0.5–5% by weight of the aqueous organic salt solution.

15. The process of claim 11, wherein the weight ratio of the aqueous organic salt solution to the polyol is between 1:50 and 1:2.

16. The process of claim 12, wherein the weight ratio of the aqueous organic salt solution to the polyol is between 1:50 and 1:2.

17. The process of claim 11, wherein the weight ratio of the aqueous organic salt solution to the polyol is between 1:10 and 1:2.

18. The process of claim 11, wherein the strength of the aqueous organic salt solution is between 10 to 70% w/w by weight of the polyol.

19. The process of claim 12, wherein the strength of the aqueous organic salt solution is between 10 to 70% w/w by weight of the polyol.

20. The process of claim 11, wherein the strength of the aqueous organic salt solution is between 15 to 45% w/w by weight of the polyol.

* * * * *